United States Patent [19]

Harada

[11] 4,171,931
[45] Oct. 23, 1979

[54] APPARATUS FOR ABATING NOISE IN AXIAL BLOWER

[75] Inventor: Iku Harada, Tama, Japan

[73] Assignee: Agency of Industrial Science & Technology, Ministry of Inter-Trade and Industry, Tokyo, Japan

[21] Appl. No.: 858,716

[22] Filed: Dec. 8, 1977

[30] Foreign Application Priority Data

Dec. 15, 1976 [JP] Japan .................................. 51/150546

[51] Int. Cl.² ........................ F04B 49/06; F01D 25/00
[52] U.S. Cl. ...................................... 417/22; 415/119
[58] Field of Search .................. 417/1, 18, 22; 73/660; 415/119, 118

[56] References Cited

U.S. PATENT DOCUMENTS

| | | | |
|---|---|---|---|
| 3,315,522 | 4/1967 | Frarey et al. | 73/660 |
| 3,913,084 | 10/1975 | Bollinger | 73/660 |
| 3,929,008 | 12/1975 | Nikolevich et al. | 73/666 |

Primary Examiner—William L. Freeh
Attorney, Agent, or Firm—Kurt Kelman

[57] ABSTRACT

In an axial blower, the noise generated by the blower increases generally in proportion to the increasing number of rotations of the blower's rotor. It has been ascertained, however, that over a given range of rotational speeds, the magnitude of noise plotted in a graph as the function of the rotational speed describes not a smooth curve but a zigzagging curve, indicating that zones of rotational speeds producing high levels of noise and those producing low levels of noise are distributed irregularly. When the axial blower is required to be operated within an operatively permissible range of rotational speeds, therefore, the noise generated by the blower can be abated to the fullest extent without entailing any reduction in the operational efficiency of the blower by means of a system which follows the change in magnitude of the noise generated by the blower as the rotational speed of the blower's rotor is sequentially changed little by little from one boundary to the other of the said range, compares the magnitudes being registered, determines the particular rotational speed that produces the lowest level of noise within the range and fixes the operation of the blower's rotor at that particular rotational speed.

3 Claims, 3 Drawing Figures

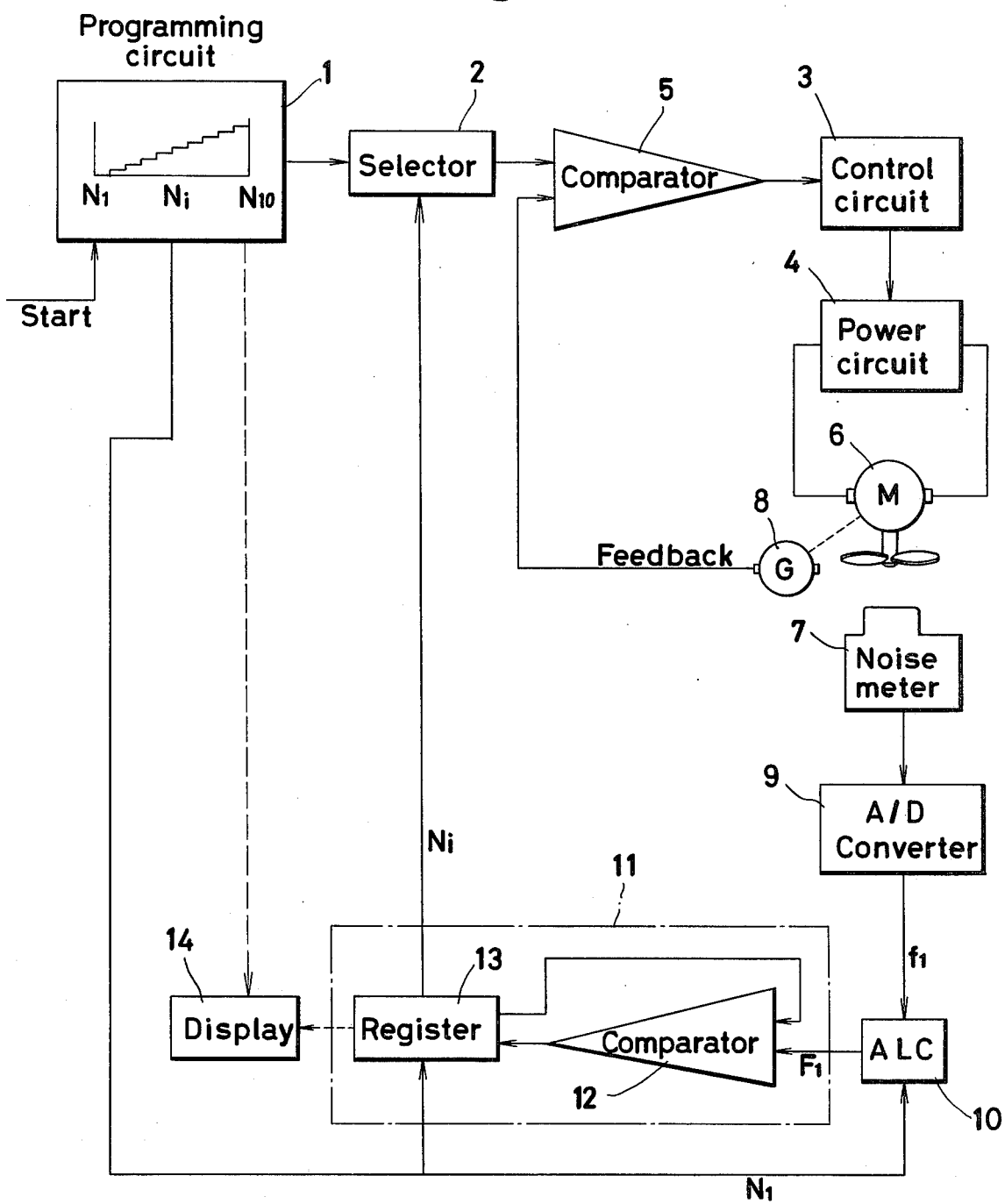

APPARATUS FOR ABATING NOISE IN AXIAL BLOWER

BACKGROUND OF THE INVENTION

This invention relates to an apparatus for abating the noise from an axial blower.

Despite its small size and light weight, the axial blower enjoys high operational efficiency and is capable of delivering large volumes of air as compared with other types of blowers and, therefore, finds favorable acceptance for use in removal of foul air from buildings and ships, in ventilation of mining pits and shafts, etc. The axial blower, however, has a shortcoming that it emits a loud noise because the blades of the rotor are operated at an unusually high peripheral speed compared with other types of blowers. The simplest way of abating the loud noise of the axial blower would be by increasing the diameter of the blower's rotor blade and thereby decreasing proportionally the peripheral speed of the blades in providing a required draft of air. Though capable of repressing the generation of loud noise without any degradation of the blower's operational efficiency, this method nevertheless proves disadvantageous in the respect that the blower size will inevitably be increased in most cases to the extent of jeopardizing its economical feasibility. There has been suggested a method for abating the noise of the blower by having a proper noise absorber disposed on the inlet side or discharge side of the duct of the axial blower. This method has a disadvantage that the noise absorber reduces the operational efficiency of the blower and the noise-abating effect aimed at is not so conspicuous as might be expected because the current of air in motion flows partly through the noise absorber as well. There has also been suggested a method for repressing the generated noise by suitably changing the angle of inclination and/or direction of the rotor blades attached to the rotary shaft of the blower and of the stationary blades attached to the casing.

An object of the present invention is to provide an apparatus for abating the noise of the axial blower effectively without giving any modification to the axial blower in itself, providing the axial blower with any specific auxiliary device such as a noise absorber or entailing any reduction in the operational efficiency of the axial blower.

SUMMARY OF THE INVENTION

To accomplish the object described above through full appreciation of the observation that, in the axial blower, a slight change in the number of rotation of the rotor blades results in a notable change in the magnitude of the noise generated by the blower and that zones of rotational speed producing high levels of noise and those producing low levels of noise are distributed irregularly in any small range of rotational speeds, there is provided according to the present invention an apparatus for abating the noise from the blower, which apparatus comprises rotary means for causing the rotor blades of the axial blower to be operated with the rotational speed thereof changed sequentially at a fixed rate within an operatively permissible range of rotational speeds, a noise meter for detecting the level of noise generated at a varying rotational speeds of the rotor blades within said range, means for comparing the levels of noise generated at said various rotational speeds and registered by said noise meter and detecting the particular rotational speed that produces the lowest level of noise within the entire range of rotational speeds and means for causing the particular rotational speed thus detected to be fed back to the rotary means.

The apparatus of the present invention for abating the noise from the axial blower is so designed as to follow the change in magnitude of the noise generated by the axial blower as the rotational speed of the blower's rotor is sequentially changed little by little from one boundary to the other of the operatively permissible range of rotational speeds, compare the levels of noise thus detected, determine the particular rotational speed that produces the lowest level of noise within the prescribed range of rotational speeds and cause the blower to be operated at that particular rotational speed. According to the present apparatus, therefore, desired abatement of the noise emitted from the blower in operation can be obtained without entailing any reduction in the operational efficiency of the blower by determining the range of rotational speeds over which the blower's rotor is sequentially changed such that all points within said range suit the purpose for which the blower is required to be operated. Further, this apparatus can be applied in its unaltered form to the axial blower currently in actual service, since it does not require the blower itself to be provided with any specific auxiliary device.

The other objects and characteristic features of this invention will become apparent from the description to be given in further detail herein below with reference to the accompanying drawing.

BRIEF EXPLANATION OF THE DRAWING:

FIG. 3 is a block diagram showing the operation of the apparatus of this invention for abating the noise from the axial blower.

DESCRIPTION OF PREFERRED EMBODIMENT:

It has generally been held that the magnitude of noise generated by the axial blower increases or decreases in direct proportion to the rotation number of the rotor blades as shown by the formula (1).

$$L_2 - L_1 = 50 \log N_2/N_1 \tag{1}$$

wherein, "$N_1$" and "$N_2$" denote rotational speeds of the rotor blades, "$L_1$" the level of noise when the rotational speed is "$N_1$" and "$L_2$" the level of noise when the rotational speed is "$N_2$".

The inventor measured the noise from an industrial-grade axial blower in actual use while causing the rotation number of its rotor blades to be changed little by little. He has ascertained through this measurement that the noise irregularly and notably increases or decreases with the smooth, linear change of the rotational speed. By repeating the experiment many times, it has been confirmed that this phenomenon is no result of error in the measurement.

Figure 1:
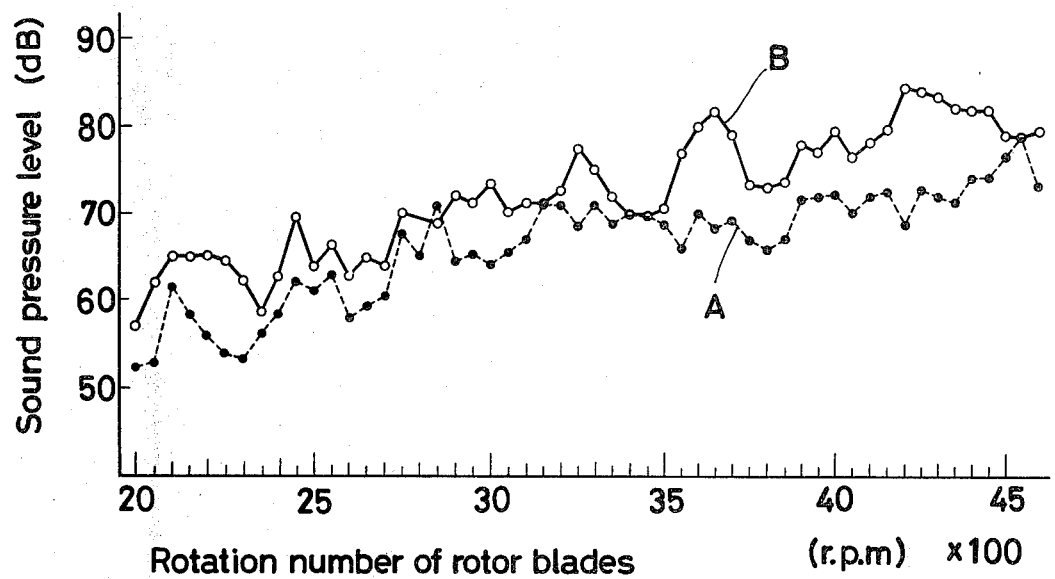
FIG. 1 is a graph showing the relation between the levels of noise generated at the discharge side and inlet side of an axial blower and the rotational speed of the rotor blades.

The graph of FIG. 1 represents the data which were obtained by installing an axial blower inside a duct 40.2 cm in inside diameter and 507.5 cm in length at such a position that the center of its seven rotor blades fell 32 cm inside the inlet side of said duct and following the change in magnitude of the noise generated by the blower as the rotational speed of its rotor blades was gradually changed in the range of from 2000 to 4600 rpm. In the graph, the curve "A" represents the change of the sound pressure level on the discharge side of the duct and the curve "B" the change of the sound pressure level on the inlet side of the duct respectively. In this measurement, there was used a noise meter having a time constant of 20 seconds.

As is plain from the graph, the noise generally increases with the increasing rotational speed of the rotor blades of the blower. A detailed review of the data, however, reveals that in an arbitrary range of rotational speeds, say in the range of from 3500 rpm to 3800 rpm, for example, the sound pressure level is about 70 dB on the discharge side as well as on the inlet side of the duct when the rotational speed of the rotor blades is 3500 rpm, whereas the sound pressure level on the discharge side falls to about 65 dB and that on the inlet side rises to about 77 dB when the rotational speed increases to 3550 rpm. In this case, when the rotational speed is further increased to 3800 rpm, the sound pressure level on the discharge side remains about 65 dB and that on the inlet side decreases to about 73 dB.

Generally speaking, the irregular variation of the sound pressure level with the change of the rotational speed of the rotor blades in the axial blower is believed to be caused in the following manner:

Since the axial blower is generally provided with a duct, the operation of the blower induces oscillation of an air column (namely, the oscillation generated by the pressure inside the duct, then caused to travel reciprocatingly inside the duct and amplified by dint of resonance) within the duct. The frequency of the oscillation of said air column is calculated from the formula (2) when the both ends of the duct are open or from the formula (3) when one of the ends of the duct is kept closed.

$$f_1 = m/2l_1 c \quad (2)$$

$$f_2 = 2m - 1/4l_2 c \quad (3)$$

wherein, "c" denotes the speed of sound (340 m/sec.), "m" a plus integer, "$l_1$" the length of duct $+1.2r$, "$l_2$" the length of duct $+1.6r$ and "r" the radius of the duct.

The noise generated from the axial blower has its peak in the basic frequency of "number of rotor blades x rotational speed " and its higher harmonic, and this basic frequency and its higher harmonic are changed with the changing rotational speed. It is, therefore, concluded that the noise gains in magnitude when the basic frequency and its higher harmonic are harmonized with said oscillation of the air column.

It is rather natural that the noise generated from the axial blower should vary apparently irregularly with the change in the rotational speed of the rotor blades. From the experiments conducted so far, it has been demonstrated that a change of only 50 rpm in the rotational speed of the rotor blades results in a change of well over 10 dB in the sound pressure level. These results serve to prove that for the purpose of noise abatement it is a highly advantageous measure to have the axial blower operated with the rotational speed of its rotor blades kept inside a range in which the noise is generated at the lowest level.

From this reasoning, there may naturally ensue the conclusion that the abatement of noise will be satisfactorily attained by having the axial blower designed from the beginning so that it will always be operated at a fixed rotational speed at which the noise is generated at the lowest level. Generally, however, the blower is required to respond to constant changes in load so that the frequency of the oscillation of air column may be varied in consequence of the change of load. As is evident from Formulas (2) and (3) above, the frequency of the oscillation of air column is variable, depending on the question as to whether both the opposite ends of the duct are open or not. The variation in the load corresponds to the difference between the absence or presence of the closure of one of the opposite ends of the duct and, consequently, affects the frequency of the oscillation of the air column.

Figure 2:
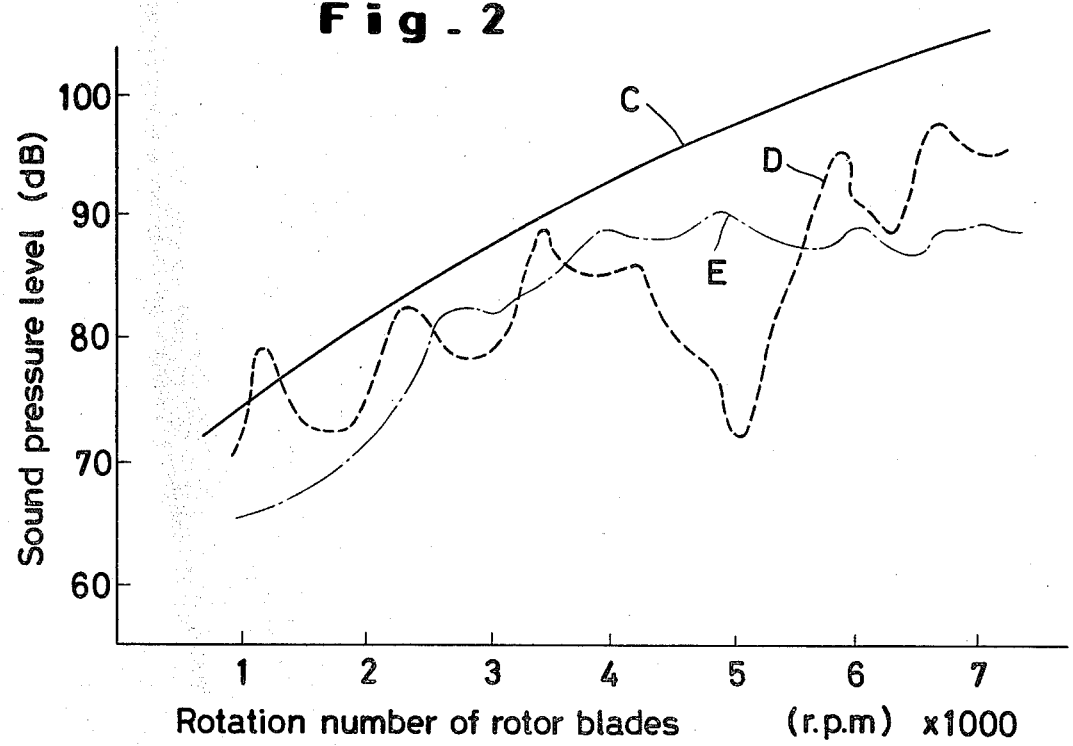
FIG. 2 is a graph showing the relation between the change in the shape of the end portion of the duct of the axial blower and the level of noise generated by the blower.

FIG. 2 is a graph showing the relation between the rotational speed of the rotor blades and the sound pressure level of the generated noise obtained by installing a blower incorporating 24 rotor blades 24 cm in diameter at such a position inside a duct 26 cm in inside diameter and 83.5 cm in length that the center of said rotor blades fell 65 cm inside the inlet side of the duct and operating this blower with the condition of the opposite ends of the duct changed variously.

In the graph, the curve "C" represents the values obtained by following the change of sound pressure level while completely curbing otherwise possible reverberation of the oscillation of air column by keeping a trumpet-shaped tube attached to the discharge side of the duct and leaving the inlet side thereof open, the curve "D" the values obtained by following the change of sound pressure level while keeping the discharge end and the inlet end of the duct both open so as to equalize the reverberation of the oscillation of the air column at both ends, and the curve "E" the values obtained by following the change of sound pressure level while keeping the discharge end of the duct completely shut and the inlet end alone open for thereby permitting the oscillation of air column to reverberate to its full extent.

It is clear from FIG. 2 that so long as the load exerted to bear upon the rotor blades is constant, namely, when the discharge end and the inlet end of the duct are so designed as to ensure perfect absence of the reverberation of the oscillation of air column, the sound pressure level increases in proportion to the increase in the rotational speed of the rotor blades, specifically at a rate of 50 log $N_2/N_1$ as determined according to Formula (1). When the noise is allowed to reverberate at either or both of the opposite ends of the duct, there occurs the oscillation of the air column, with the result that the sound pressure level is irregularly changed against the change in the rotational speeds of the rotor blades as illustrated by the curve "D" or "E" and, consequently, noise is generated.

Even though the axial blower itself may be designed from the beginning so that the rotor blades will operate at a suitable fixed rotational speed, it is still difficult from the practical point of view to abate the noise of the blower to any satisfactory extent because said rotational speed is changed by the change in the load on the blower, the condition of the installation of the blower and the condition of the blower operation itself.

In full appreciation of the difficult situation, the present invention aims to abate the noise generation effectively by setting a specific operatively permissible range of rotation numbers such that the rotational speed selected for the immediate purpose for which the axial blower is to be operated will not fall substantially below the lower limit of said range, following the change in magnitude of noise generated throughout this range for thereby detecting the particular rotational speed that produces the lowest level of noise and fixing the operation of the blower at that particular rotational speed. Said range of rotational speeds can be suitably set to extend from 5% below to 5% above what is determined to be the optimum rotational speed under normal operating conditions of the blower. At any event, this range should be fixed with due consideration paid to the purpose for which the blower is used, the conditions under which it is operated and other similar factors. The accuracy with which the particular rotational speed that produces the lowest level of noise is detected increases with the increasing fineness of the unit increment with which the rotational speed is gradually changed within the entire range. For ordinary purposes, it suffices to fix the unit increment at 20 to 50 rotations.

Now, the present invention will be described specifically with reference to the process flow illustrated in FIG. 3.

With reference to FIG. 3, the rotational speed N to be calculated from the various conditions for providing a forced draft of air, the operatively permissible range $N_1$ through $N_{10}$ (in the illustrated embodiment) of the rotational speed, the sum of the sampling rotational speeds, namely the sum of unit increments involved in the stepped variation of the rotational speed within the entire range of rotational speeds and the time for sampling are set in advance in the programming circuit 1. When a command to start "operation" is given to the programming circuit 1, a signal for causing the blower to be operated first at the rotational speed $N_1$ is issued from the circuit 1 and forwarded through the selector 2, the comparator 5 and the control circuit 3 to the circuit 4 for the driving power source of a motor 6 of the blower. On reception of said signal, the circuit 4 for the driving power source applies a prescribed magnitude of voltage upon the motor 6 of the blower, with the result that the rotor blades of the blower begin to rotate at the rotational speed $N_1$. To the motor is directly connected a tacho-generator 8. The electromotive force which is induced by this generator 8 is fed back to the comparator 5, there to be compared in terms of phase with the signal issuing from the programming circuit 1. When the comparison reveals a deviation, the control circuit 3 compensates the signal en route to the power source circuit 4 for said deviation. The signal now in its compensated form its allowed to proceed to the power source circuit 4. This means that the motor is operated at a constant rotational speed even when there is possibly a variation in the load being applied to the rotor blades. The mechanism so far described represents one example of the methods available for the automatic control of the motor's rotational speed. This automatic control can likewise be fulfilled by using any of the servo-mechanisms known to the art.

Separately, a noise meter 7 is to be disposed at the discharge end or the inlet end of the duct, near the rotor blades or at some other prescribed position. The noise meter should be disposed at a position a which there is a greater need for abatement of the generated noise than at any other position. Preferably, the noise meter to be used for the purpose will be of a type having a high time constant which does not respond with excessive sensitivity to noise occurring only instantaneously. Said noise meter 7, therefore, detects only the noise that is generated by the blower operating at the constant rotational speed when the rotation thereof continues in a stable condition. An electric signal corresponding in magnitude to the noise thus detected is delivered to the A/D converter 9 to be converted into a digital signal, which is then forwarded to the arithmetic and logic circuit 10. When there is used a digital noise meter, the output of this noise meter is directly forwarded to said arithmetic and logic circuit 10. In the arithmetic and logic circuit 10, the digital signal $f_1$ from the noise meter is labelled as signal $F_1$ by using as the address the signal representing the rotational speed of the motor which has been forwarded from the programming circuit 1. The signal $F_1$ is forwarded to the comparator 12 in the selector circuit 11. Being the first arrival at the comparator, this signal $F_1$ is relayed in its unaltered form to the register 13 to be stored therein. As occassion demands, the rotational speed and the level of noise existing at that time are shown in the display 14.

After lapse of a prescribed length of time, the programming circuit 1 issues a signal for causing the motor to be operated at the subsequent rotational speed $N_2$. Similarly to the former signal, this signal is forwarded through the selector 2, the comparator 5, and the control circuit 3 to the power circuit 4, with the result that the operation of the motor is switched to the new rotational speed $N_2$. The noise which is generated at this time by the blower is detected by the noise meter 7 and converted into a corresponding digital signal, which is then labelled in the arithmetic and logic circuit 10 with the address of the rotational speed and subsequently forwarded to the comparator 12. In the comparator 12, the level of noise represented by the incoming signal and that of the signal stored formerly in the register 13 are compared with each other. Of the two signals thus compared, the one which represents the lower level of noise is now commited to storage in the register 13 in place of the signal stored formerly therein. The procedure is repeated for the successively larger rotational speeds in the series of rotational speeds to be sampled, with each of the levels of noise detected subjected to comparison in the comparator 12. After the level of noise detected in the procedure involving the last rotational speed $N_{10}$ has been subjected to this comparison, the signal representing the particular rotational speed $N_i$ producing the lowest level of noise throughout the entire range of rotational speeds is stored in the register 13. After the command for the blower operation at the last sampling rotational speed $N_{10}$ set within the prescribed range of rotational speed has been issued from the programming circuit 1, this circuit issues a signal for completion of sampling to the selector 2 and the register 13. This signal causes the signal of the rotational speed $N_i$ stored in the register 13 to be forwarded to the selector 2, making the motor 6 operate at the rotation number $N_i$. The rotor blades are operated at this particular rotational speed by feeding back the electromotive force generated in the tacho-generator 8.

The configuration of the circuitry used for the selection of the particular rotational speed is not necessarily limited to that cited above by way of example. It may freely be formed by combining known circuits selectively. For example, the circuitry described above may be modified so that the particular rotational speed producing the lowest level of noise which has been obtained at the register 13 will be forwarded to the programming circuit 1 and the operation of the motor 6 will be commenced by the signal from the programming circuit 1.

As concerns the kind of the motor to be adopted for controlling the rotational speed, it is self-evident that not merely the ordinary motor but also an induction motor, a hydraulic motor or some other similar motor is usable.

As described above, the apparatus of the present invention effectively enables the blower to be operated at the particular rotational speed which produces the lowest level of noise within the range of permissible rotational speeds dictated by operational conditions. As is clear from the graph of FIG. 1, however, the noise generated by the blower at that particular rotational speed is subtly changed when the operating conditions such as, for example, the ambient temperature and the condition of air draft are varied to some extent. The abatement of the noise from the blower can be obtained continuously, therefore, by repeating said series of sampling of rotational speeds in the prescribed range at fixed intervals of 10 minutes, for example.

It is clear from the detailed description given above that the method for abating the noise from the axial blower according to the present invention differs totally from any of the methods so far known to the art.

Having originated in the observation that the level of noise generated by the axial blower as the function of the rotational speed varies with conspicuous irregularity, the present invention aims to accomplish the desired abatement of the noise by an apparatus which follows the change in level of the noise while the rotation number of the rotor blades is sequentially increased or decreased by a small unit throughout the range of permissible rotational speeds, compares the levels of noise thus detected for the various sampling rotational speeds to determine the particular rotational speed that produces the lowest level of noise and fixes the operation of the blower at that particular, rotational speed. Thus, the present invention can be applied in its unaltered form to axial blowers already in service. Further, incorporation of this apparatus into a blower using a conventional noise absorbing device or a blower provided with special means for absorption of noise adds all the more to the effect of noise abatement. The axial blower is not the only type of blower for which the present invention produces the intended effect. This invention can be advantageously utilized also for the type of a blower which irregularly produces noise such as, for example, a centrifugal blower.

What is claimed is:

1. An apparatus for abating the noise issuing from an axial blower having rotor blades, which comprises means for causing the rotor blades of the axial blower to be rotated at rotational speeds sequentially varied at a fixed unit within a range of permissible rotational speeds, a noise meter for measuring levels of noise generated by said axial blower at said sequentially varied rotational speeds, means for comparing the levels of noise sequentially measured by said noise meter and thereby selecting a rotational speed that produces the lowest level of noise, means for generating a control signal corresponding to the selected rotational speed, and means for delivering the control signal to the rotating means to cause the rotor blades of the axial blower to rotate at the selected rotational speed.

2. The apparatus according to claim 1, wherein the noise meter is of a type having a large time constant.

3. The apparatus according to claim 1, which further comprises a circuit for causing the rotor blades of the axial blower to be rotated at constant rotational speeds.

* * * * *